Oct. 3, 1961  S. SALEM ET AL  3,002,228
METHOD OF VULCANIZING NYLON TIRES
Filed June 6, 1958  2 Sheets-Sheet 2

INVENTORS
Samuel Salem
Rollin H. Spelman
BY McCoy, Greene & Te Grotenhuis
ATTORNEYS

3,002,228
METHOD OF VULCANIZING NYLON TIRES

Samuel Salem and Rollin Henry Spelman, Akron, Ohio, assignors to The General Tire & Rubber Company, Akron, Ohio, a corporation of Ohio
Filed June 6, 1958, Ser. No. 740,316
4 Claims. (Cl. 18—53)

This invention relates to a method of vulcanizing pneumatic tire casings that are reinforced by fabric plies that are composed of synthetic linear polymer filaments such as high melting point polyamide or polyester filaments, and particularly to a method of vulcanizing tire casings reinforced with nylon cord fabric.

The use in tire casings of fabric plies composed of synthetic linear filaments such as nylon is desirable because of the high tensile strength of the filaments, which makes it practicable to manufacture heavy duty tires with relatively thin side walls and of relatively light weight, requiring less rubber and developing less heat in operation.

A serious obstacle to the successful use of nylon fabric in tires has been the tendency of nylon cords to progressively and permanently elongate when the tire is in service due to tension stresses to which the cords are subjected and to the heat generated in the tire by running under load. This characteristic of nylon cords causes the tire casings to increase in size or "grow." The enlargement of a tire casing sets up stresses in the treads which cause cracks to develop in the tread, greatly reducing the resistance of the tread to wear (see U.S. Patent No. 2,625,981).

In order to reduce the extensibility of nylon cords in tire casings, a preliminary treatment has been devised by means of which the cords are prestretched and set in the prestretched condition so that the stretching of the cords in service is greatly reduced (see U.S. Patent No. 2,679,088). Such treatment, however, does not solve the problem, since objectionable tire growth and tread cracking has been found to occur in tires reinforced with prestretched nylon. This is particularly true of heavy duty tires such as truck tires.

The present invention provides a method of vulcanizing tire casings reinforced with prestretched nylon cords such as "Nygen" cords or other commercial tire cords which reduces tire growth and practically eliminates tread cracking.

In curing nylon cord tire casings by the method of the present invention, the tire casings are heated in a vulcanizing mold to a temperature above 300° F. for a sufficient period of time to effect the desired vulcanization. During the vulcanizing operation, steam or hot water in an expansible core within the tire casing applies heat to the casing and exerts an internal pressure greater than 100 lbs. per square inch on the casing. At the end of the vulcanizing period any steam is replaced with hot water and the hot water is replaced with cold water, which is caused to flow through the expansible core under pressure not greatly less than the curing pressure until the tire casing is cooled to at least 280° F. and preferably until the casing has been cooled below a temperature of 260° F.

It has been found that by cooling the nylon cord tire casings while maintaining an internal pressure substantially the same as the vulcanizing pressure or sufficient pressure to prevent shrinking of the nylon fabric, the growth of the tire in service is greatly reduced and cracking of the treads in service is substantially eliminated.

It is believed that the improvement in the quality of nylon cord tires cooled while subjected to internal pressure is due to the fact that such cooling prevents shrinkage of the nylon fabric embedded in the tire casing.

The preliminary treatment of the nylon tire cords sets them in a prestretched condition so as to reduce the stretching of the cords after they are embedded in the tire casing. The heating of the tire cords to the temperature to which they are subjected during the vulcanizing operation tends to shrink the prestretched cords and sets up tension in the nylon fabric of a tire being vulcanized which is often sufficient to create a slight but detectable distortion of the tire tread.

In vulcanizing tires by conventional methods the tire is removed from the mold before the cure is completed and vulcanization continues during the slow cooling of the tire.

It is believed that the cracking of the treads of nylon cord tires made with prestretched cords is due largely to shrinkage of the prestretched cords prior to complete vulcanization of the tire casing which subjects surface portions of the partially cured tread to compression, thereby increasing the susceptibility of the tread to cracking. The shrinkage of the prestretched fabric increases its stretchability and the stretchability of the fabric, together with the compression stresses in the rubber, results in excessive cracking and rapid deterioration of the tire.

By cooling the tire casing in the mold while maintaining an internal pressure on the casing sufficient to hold the nylon fabric against shrinkage, a more complete cure of the rubber can be effected before removal from the mold and the tension of the nylon cords tending to shrink the tread will also be reduced.

Because of the more complete curing of the tire before removal from the mold and the reduction in the tension in the nylon cords before release of internal fluid pressure, the cords in the completed tire are substantially in their prestretched condition and growth of the tire in service is grealy reduced and tread cracking is practically eliminated. Cooling of the tire casing as little as to 280° F. effects a substantial improvement in the quality of nylon tires. However, it is desirable to continue the cooling to below 260° F. before discontinuing the application of internal pressure to the casing.

An object of the present invention is to provide a method of making very high quality nylon-reinforced pneumatic tires.

A further object of the invention is to provide a fast inexpensive method of vulcanizing nylon tire casings.

Other objects, uses and advantages of the present invention will occur to those skilled in the art from the following description and claims and from the drawings, in which:

Reference should be had to the drawings in which like parts are identified by the same numerals throughout the several views.

Figure 1:
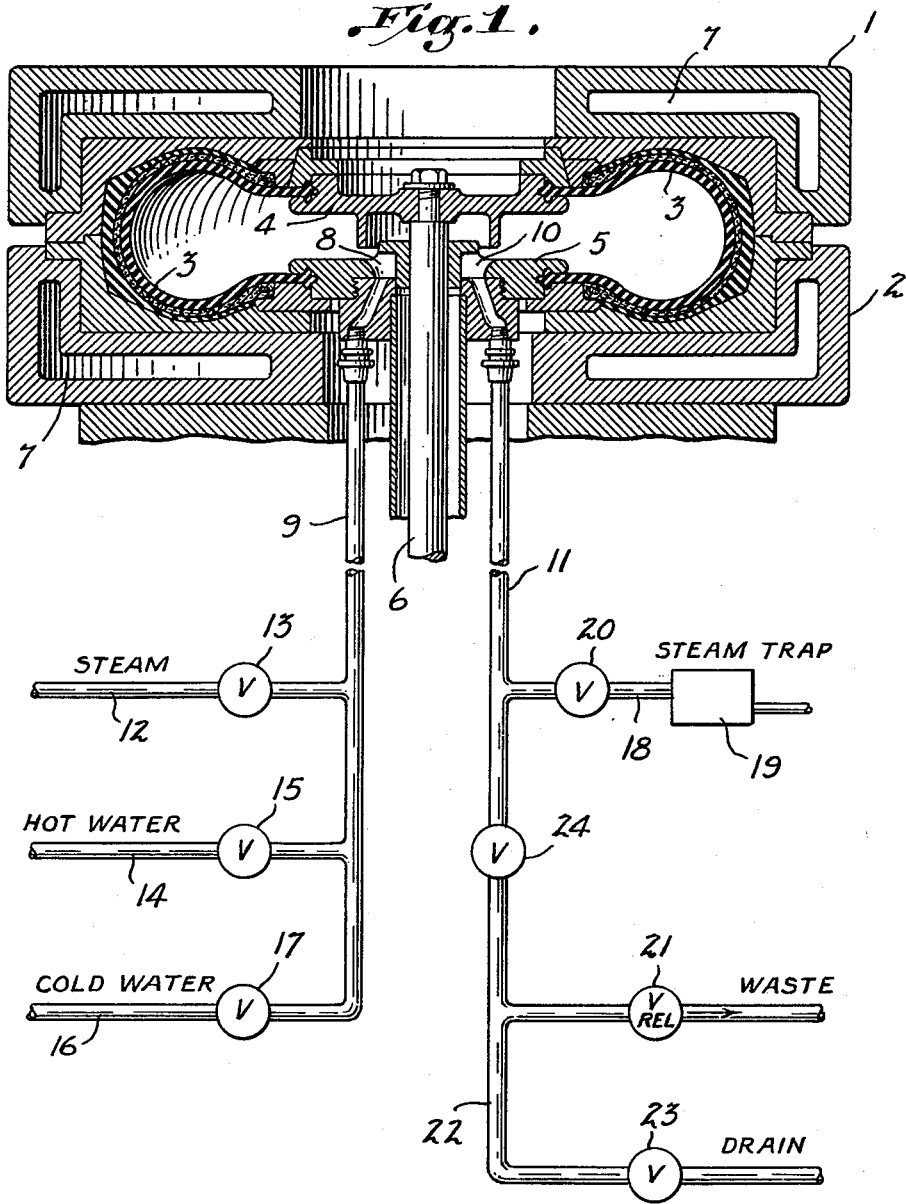
FIGURE 1 is a sectional view on a reduced scale showing a vulcanizing mold suitable for use in practicing the present invention.

The tire mold has top and bottom sections 1 and 2 that are formed to provide a cavity between them that conforms to the exterior of a tire casing A. The mold also has an expansible core in the form of an expansible tubular diaphragm 3 that may be made of elastic rubber and that has its end edges clamped to upper and lower circular heads 4 and 5 that form end closures for the tubular diaphragm 3 that are fluid tight so that the diaphragm can be expanded radially by internal pressure. The heads 4 and 5 are of a diameter less than the internal diameter of the tire casing and the top head 4 is movable axially toward the bottom head 5 to enable the flexible diaphragm to expand into the interior of the tire casing and away from the bottom head 5 to draw the diaphragm to substantially cylindrical form so that the tire casing A can be inserted into or removed from the mold. The bottom head 5 is fixed to the bottom mold section 2 and the top head 4 is carried by an axially movable piston 6 that can be operated by suitable means to raise or lower the head. The mold sections 1 and 2 have cavities 7 adapted to receive steam under pressure to apply heat externally to the tire casing during vulcanization. The lower head 5 has an inlet port 8 connected to a pipe line 11. The pipe line 9 is connected to a steam line 12 controlled by a valve 13, to a hot water line 14 controlled by a valve 15, and to a cold water line 16 controlled by a valve 17. The pipe line 11 is connected to a branch line 18 that connects it to a steam trap 19, the line 19 being provided with a valve 20 to open or close communication between the pipe line 11 and the steam trap 19. A pressure relief valve 21 is provided in the line 11 beyond the branch line 18 and the line 11 is also connected to a drain 22 controlled by a valve 23. A manually operable valve 24 is provided between the relief valve 21 and the branch line 18.

During the vulcanizing operation the valves 13 and 20 are opened and the valves 15, 17, 23 and 24 are closed, so that steam is maintained at the desired pressure within the expansible core of the mold. At the termination of the vulcanizing period the valve 20 is closed and the valve 24 is opened to connect the expansible core with the relief valve 21. The valve 13 is then closed and the valve 15 is opened to deliver hot water into the expansible core under a pressure that is maintained by the pressure relief valve 21. After about one minute the valve 17 is opened and the valve 15 is closed to deliver cold water under pressure into the core to replace the hot water, without changing the pressure which is maintained by the relief valve 21. After the cold water has flowed through the core for a sufficient length of time to effect the desired cooling, the valve 17 is closed and the valve 23 is opened to relieve the pressure acting on the diaphragm 3 and draw the water from the core. The top mold section is then lifted off the bottom section 2 and the piston 6 is moved upwardly to extend the diaphragm axially and to reduce its diameter enough to permit the tire casing A to be lifted from the mold.

In vulcanizing tire casings reinforced with cotton or rayon fabric there is no advantage in employing an extended cooling period. It is, however, necessary that the steam be discharged and that any water within the core be at a temperature below the boiling point when the mold is open so that the diaphragm will not be expanded by internal steam pressure and perhaps ruptured when the mold is opened.

In order to prevent the formation of steam in the core when opening the mold, it has been common practice to flow hot and cold water through the mold for a short period of time prior to opening the mold. This cooling period has been about three minutes and it has been found that the temperature of tires removed from the mold after the three minute cooling period has been above 290° F. Corresponding nylon fabric tire casings vulcanized in the same manner have been found to be subject to objectionable growth and tread cracking. If, however, the cold water is circulated through the core while under pressure substantially the same as the curing pressure for a period of about ten minutes, the tire casing A is cooled to a temperature below 260° F. and the tendency to grow in service is reduced to such an extent that tread cracking is practically eliminated.

It has been found that if the nylon cord tire casings are cooled without relieving the internal pressure to a temperature of 280° F. before the mold is opened, the tendency of the treads to crack is greatly reduced. However, a further reduction in the tendency to crack is obtained by cooling the casing below 260° F. and the lower temperature is preferred, particularly for heavy duty tires, although the vulcanizing period is increased several minutes by such additional cooling. The curing pressure is more than sufficient to resist the tension created by heat in the nylon cords and to hold the tire casing against shrinkage. The internal pressure on the casing during cooling necessary to prevent shrinkage of the nylon fabric is materially less than the curing pressure, particularly in the lighter tires such as ordinary automobile tires. However, it is the usual practice when cooling the nylon in the mold to maintain an internal pressure during cooling substantially the same as the curing pressure so that shrinkage of the nylon is impossible.

The heating of the mold sections 1 and 2 by the steam in the cavities 7 may be discontinued when cooling fluid is supplied from line 16 to cool the nylon cords of the tire, but it is preferable to direct cooling fluid only to the interior of the tire casing and to keep the cavities 7 at the same temperature throughout the vulcanization and cooling process so that the thicker tread portion of the tire is cured for a longer period of time as is the case during conventional cures when the hot tire is removed from the mold.

It is obviously unnecessary during the practice of the present invention to maintain the tire casing in the mold during the cooling under pressure because, as long as the mold is not cooled with the tire therein, the thread portion retains sufficient heat to cure it further upon removal from the mold. The cooling of the inside of the casing must take place while pressure is maintained in the inside of the tire, with or without a tube or core, to keep the nylon from cooling in a contracted state and thus subjecting the tread to compression during final stages of cure.

Thus, in the alternate method, the tire casing A removed from the mold without cooling the mold below a curing temperature is placed on a tire supporting and inflating apparatus 25 and a fluid pressure within the tire is maintained until the nylon fabric cools below 280° F. and preferably below 260° F. The tread 26 of the tire casing A cooling only slowly in air will continue to cure outside the mold until its temperature is below the curing temperature and interior portions may have a temperature substantially greater than that of the prestretched nylon fabric 27 of the tire at the end of the process when the internal pressure is released.

The tire supporting apparatus 25 comprises a rigid table 28 mounted in a fixed position on the floor and having a lower circular member 29 rigidly mounted thereon. The member 29 is similar to a wheel rim and has an annular bead-receiving portion 30 providing a bead-engaging surface similar to that of a wheel rim flange. The member 29 has an annular hub 31 which is rigidly connected to an externally cylindrical vertical shaft 35. The shaft provides a support for an upper circular member 33 having an annular bead-receiving portion 34 similar to the portion 30. The bead-engaging surfaces of the portions 30 and 34 conform to the shape of the bead portions 24 of the tire casing A so that leakage of air may be prevented as in conventional tubeless tires. The annular hub portion 35 of the member 33 has an internal diameter corresponding to the external diameter of the shaft 32 and is adapted to slide vertically on said shaft. The shaft has an annular groove which receives a circumferential elastic rubber O-ring 36 which prevents leakage of air between the shaft 32 and the hub portion 35.

Figure 3:
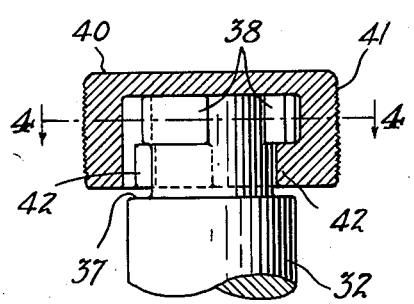
FIGURE 3 is a fragmentary sectional view similar to FIG. 2 but on a larger scale showing the apparatus for supporting and inflating the tire during cooling thereof.
Figure 4:
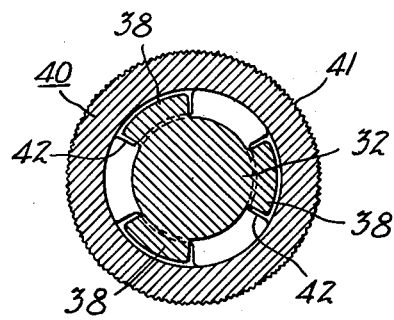
FIGURE 4 is a horizontal sectional view taken on the line 4—4 of FIG. 3 and on the same scale.

The upper end portion of the shaft 32 is shaped to provide an annular groove 37 and three regularly spaced radially projecting lugs 38 as shown in FIGS. 3 and 4. The lugs provide a bayonet joint for receiving a generally cylindrical manual bayonet-type locking member 40. The member 40 has a knurled outer circumferential surface 41 and is shaped to provide three regularly circumferentially spaced inwardly directed lugs 42 of a size to slide axially between the lugs 38 and to engage the bottom surfaces of the lugs 38 when the member 40 is turned about 30 degrees or so. The bayonet joint prevents axial movement of the member 40 and limits axial movement of the plate 33 so as to permit inflation of a tire casing A mounted on the apparatus 25. The bayonet joint permits instant removal of the member 40 and quick removal of the plate 33 so as to facilitate mounting of a tire casing A on the apparatus 25 and removal of the casing therefrom.

Figure 2:
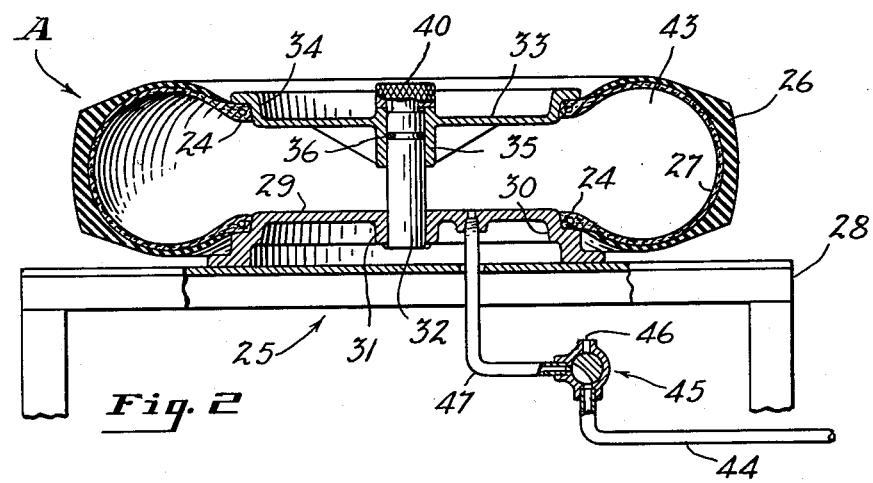
FIGURE 2 is a vertical sectional view on a reduced scale showing a tire-mounting apparatus which may be used to inflate a pneumatic tire removed from the mold of FIG. 1 to prevent shrinking of the nylon fabric according to one method of this invention.

Any suitable means may be provided for inflating the casing A when it is mounted on the apparatus 25. As herein shown air, liquid or other fluid under pressure is pumped into the chamber 43 from a supply line 44 which is controlled by a three-way valve 45. The valve 45 has an exhaust port 46 to permit exhausting air from the chamber 43 and supplies air to said chamber through a conduit 47 as indicated in FIG. 2.

According to the alternative method of this invention, the tire casing A is subjected to a curing temperature in excess of 300° F. by heating the exterior and interior of the casing in the vulcanizing mold (1—2) while subjecting the casing to an internal curing pressure of at least 100 lbs. per square inch applied by steam in the curing bag 3. While still at a temperature above 300° F., the tire casing A is removed from the mold, separated from the curing bag, immediately placed on the apparatus 25 with its bead portions 24 sealingly engaging the rim portions 30 and 34, and reinflated to a pressure sufficient to prevent shrinking of the nylon cord fabric 27. Such pressure may even be as low as 10 lbs. per square inch or may approach the pressure required to cause rupturing of the casing, the pressure being preferably around 40 to around 80 or 90 lbs. per square inch. The tire casing A is maintained under a pressure sufficient to prevent shrinking of the nylon until it cools below 280° F. and preferably below 260° F. Inasmuch as the mold is maintained at curing temperature, the residual heat in the thicker tread portion 26 causes further curing of the tread during the cooling operation. The pressure may then be released by turning the valve 45 to establish communication between the conduit 47 and the exhaust port 46, the locking member 40 and the top member 33 may be removed, and the completed tire casing A may be lifted off the apparatus 25.

The apparatus 25 requires removal of the curing bag from the tire casing A and mounting of the casing on a different support, but it will be apparent that, when the tire is cured in the mold on portable apparatus, for example as disclosed in FIG. 4 of U.S. Patent No. 2,824,336, which may easily be removed from the mold without removing the curing bag, the internal pressure required to prevent shrinking of the nylon cords may be applied by supplying cooling fluid to the inside of the curing bag after the tire is removed from the mold.

Figure 5:
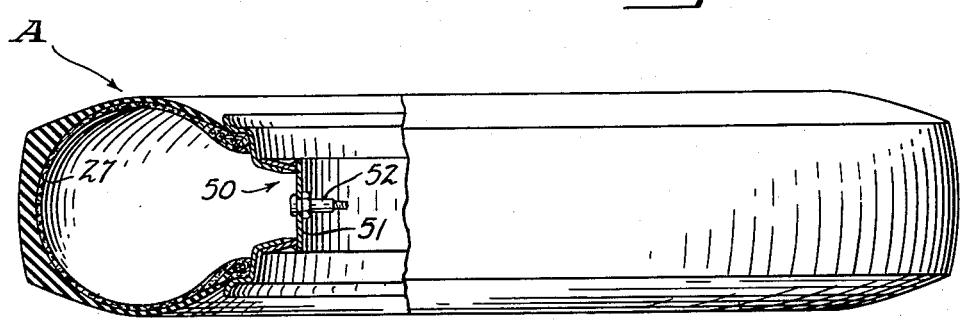
FIGURE 5 is a side elevational view on a reduced scale with parts broken away and shown in section illustrating a modified form of the invention wherein the hot tire is cooled while inflated on a rim.

FIGURE 5 illustrates the modified form of apparatus for cooling the hot tire while inflation tension is applied to the nylon cords thereof. The tire casing A is removed from the mold without cooling the mold, so that heat is retained in the tread portion to cause further curing, is placed on the rim 50, preferably having an extra deep drop center portion 51 to facilitate rapid mounting before cooling of the tire occurs. The rim is equipped with a valve stem 52 containing a valve (not shown) of the type usually used in pneumatic tires. The casing A is preferably provided with the usual impervious inner liner or skim coating (not shown) of rubbery material over the fabric surface portions 27. This lining cooperates with the rim 50 to provide an impervious core or tube to hold the inflation pressure applied thereto. Immediately upon removal of the tire from the mold, it is mounted upon the rim 50 to cooperate therewith and provide an air-retaining cavity. Inflation pressure is applied through the valve stem 52 to the cavity or core of the casing to prevent fabric of the casing from cooling in a contracted state. The casing and rim assembly under pressure may then be hung as is a tire casing alone on a conveyor and removed from the curing area. Since the tread portion 26 was removed from the mold without cooling the mold, substantial cure takes place while the inside or core of the casing A is being cooled below 280° F., or preferably below 260° F. The pressure thereafter is released.

The rim 50 with the hot casing A mounted thereon may easily be mounted on a hook of a conventional overhead trolley conveyor of the type used extensively in rubber tire factories. The major portion of the cooling of the inflated casing A may be effected while the casing is carried by the conveyor.

This application is a continuation-in-part of our co-pending application, Serial No. 423,875, filed April 19, 1954, now abandoned.

It will be understood that the above description is by way of illustration rather than limitation and that, in accordance with the provisions of the present statutes, variations and modifications of the specific devices herein shown or described may be made without departing from the spirit of the invention.

What we claim is:

1. The herein described method of vulcanizing tire casings reinforced with prestretched nylon cord fabric which comprises subjecting said casing to a curing temperature in excess of 300° F. for a predetermined time by heating the exterior and interior of the casing in a vulcanizing mold having a cavity that conforms to the exterior of the casing and an expansible core that conforms to the interior of the casing when expanded against the same by fluid pressure while subjecting the casing to an internal curing pressure of at least 100 lbs. per square inch applied by steam in said core, and cooling the fabric plies at the inside of said casing to a temperature below 280° F. by directing cooling fluid only through said core while holding the nylon fabric against shrinkage by applying pressure to the interior of said casing.

2. The herein described method of vulcanizing tire casings reinforced with prestretched nylon cord fabric which comprises subjecting said casing to a curing temperature in excess of 300° F. for a predetermined time by heating the exterior and interior of the casing in a vulcanizing mold having a cavity that conforms to the exterior of the casing and an expansible core that conforms to the interior of the casing when expanded against the same by fluid pressure while subjecting the casing to an internal curing pressure of at least 100 lbs. per square inch applied by steam in said core and cooling the inside of said casing to a temperature below 260° F. while maintaining internal fluid pressure on said casing during the cooling operation to hold said casing against shrinkage and while maintaining said vulcanizing mold at curing temperature.

3. The herein described method of vulcanizing tire casings reinforced with prestretched nylon cord fabric which comprises subjecting said casing to a curing temperature in excess of 300° F. for a predetermined time by heating the exterior and interior of the casing in a vulcanizing mold having a cavity that conforms to the exterior of the casing and an expansible core that conforms to the interior of the casing when expanded against the same by fluid pressure while subjecting the casing to an internal curing pressure of at least 100 lbs. per square inch applied by steam in said core, replacing the steam in said core with water, and circulating water through said core to cool the fabric plies of the tire casing to a temperature below 280° F. while holding said casing by fluid pressure in said core against the mold during the cooling operation to prevent shrinkage of the nylon fabric as it is cooled.

4. The method of manufacturing a pneumatic tire, the casing of which is reinforced with heat-shrinkable fabric cords of prestretched nylon, which comprises, vulcanizing the tire under fluid pressure at a temperature in excess of 300° F. in a confining mold, cooling the tire under pressure after vulcanization to a temperature at which said cords have no appreciable shrinkage and thereafter relieving the pressure.

References Cited in the file of this patent

UNITED STATES PATENTS

| | | |
|---|---|---|
| 1,605,683 | Meyer et al. | Nov. 2, 1926 |
| 2,066,265 | Freeman | Dec. 29, 1936 |
| 2,104,673 | Rieser | Jan. 4, 1938 |

FOREIGN PATENTS

| | | |
|---|---|---|
| 1580/56 | Union of South Africa | Nov. 29, 1955 |